United States Patent [19]

Pepping

[11] Patent Number: 4,828,152
[45] Date of Patent: May 9, 1989

[54] ROD BELT SUSPENSION SYSTEM

[76] Inventor: Kenneth E. Pepping, 682 Redwood La., San Dimas, Calif. 91773

[21] Appl. No.: 139,193

[22] Filed: Dec. 29, 1987

[51] Int. Cl.$^4$ ............................................. A01K 97/10
[52] U.S. Cl. .................................... 224/200; 224/253; 224/907; 224/922; 43/21.2
[58] Field of Search ............... 224/200, 197, 191, 226, 224/224, 907, 922, 253, 162; 43/21.2, 25; 248/538, 534; D3/100, 104; D22/147

[56] References Cited

U.S. PATENT DOCUMENTS

| 2,735,596 | 2/1956 | Smedley et al. | 43/21.2 |
| 2,969,899 | 1/1961 | Brooks | 224/922 |
| 3,287,844 | 11/1966 | Hoxter | 43/21.2 |

FOREIGN PATENT DOCUMENTS

| 10333 | 7/1916 | United Kingdom | 224/922 |

*Primary Examiner*—Renee S. Luebke
*Attorney, Agent, or Firm*—John E. Wagner

[57] ABSTRACT

A fishing harness and rod belt or holder is disclosed intended for use in standup fishing of large salt water game fish. The system comprises a kidney belt in the order of six inches or more in width and of length sufficient to extend around the back and over the hips and includes a belt portion which extends across the front of the fisherman near his waist to hold the kidney belt portion in position and to allow the spreading of load over the large area of the fisherman's lower back. Internal stays in the kidney belt help to stiffen the kidney belt and spread the load. Suspended from the end regions of the kidney belt are a plurality, e.g. two adjustable length straps from which a rod belt or holder is suspended over the fronts of the legs of the fisherman. The rod belt or holder includes a recess or cup with a pin therein for holding the butt end of a game fish rod of the type which has a recess or other means to engage the pin of the rod belt pin and cup. A second set of straps are secured to the kidney belt and similarly are adjustable in length. The second set of straps are designed to be hooked to the fishing reel attached to the game fish rod.

9 Claims, 2 Drawing Sheets

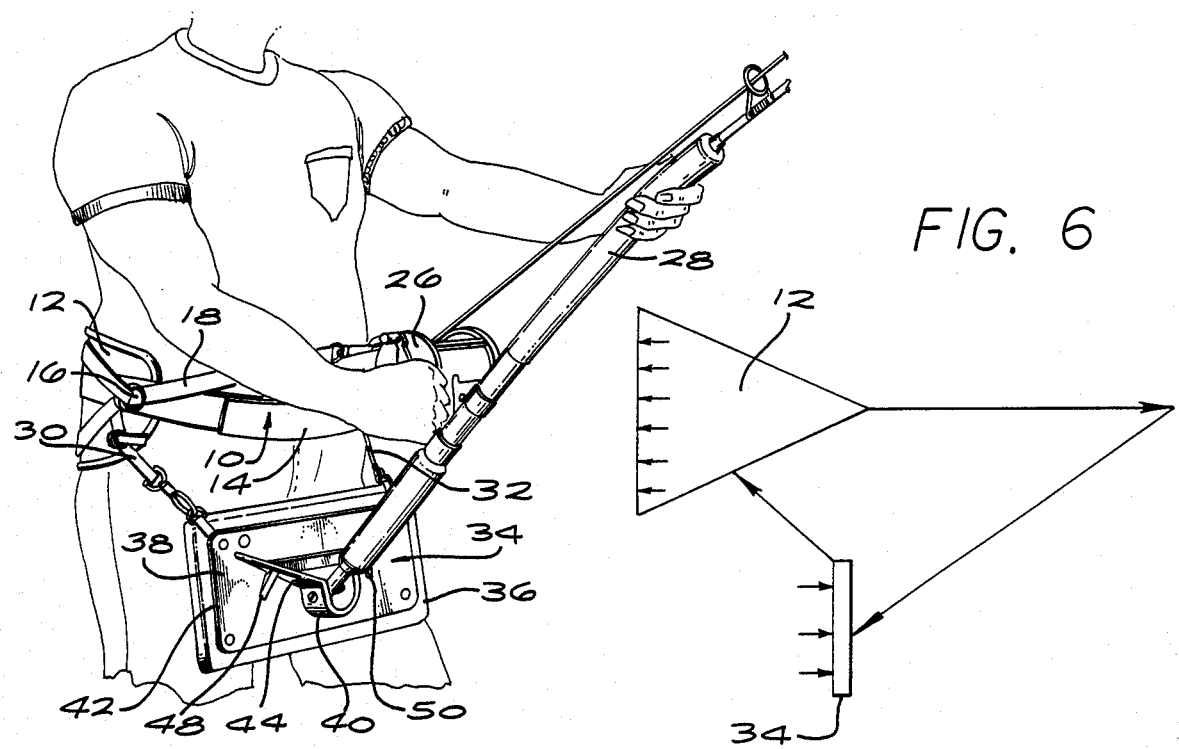
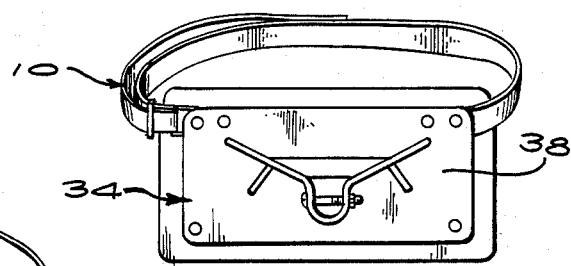
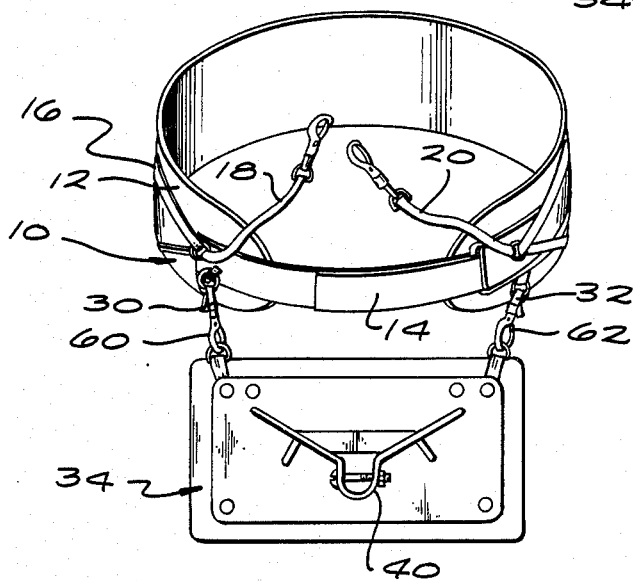
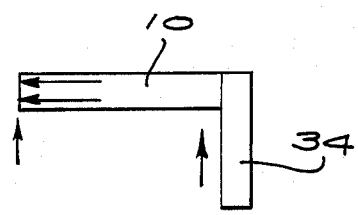

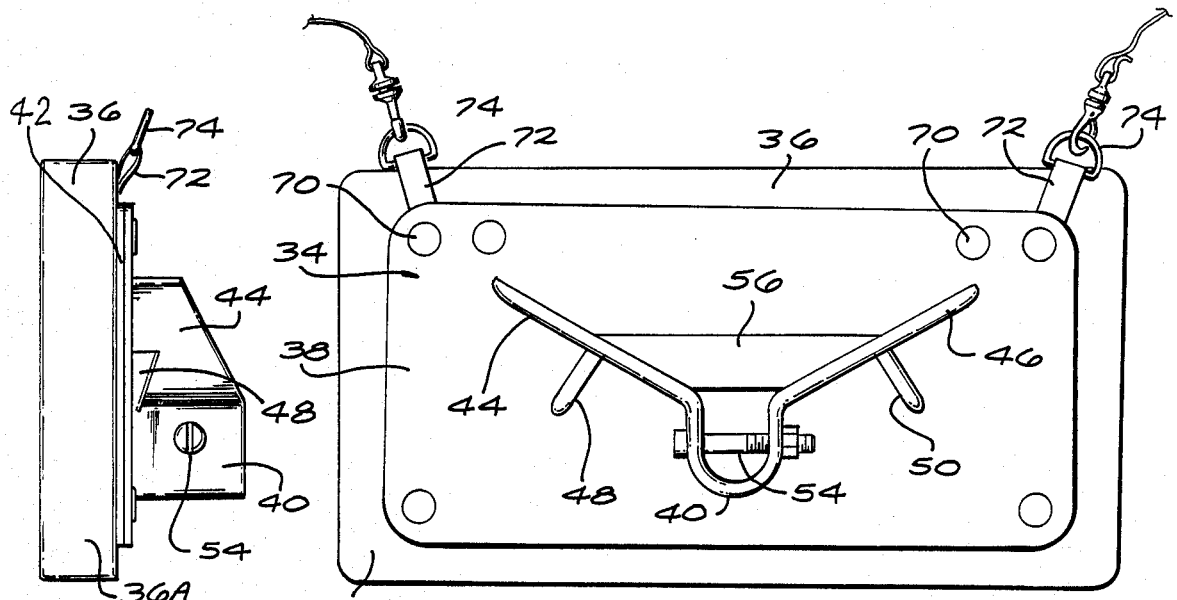
FIG. 5  FIG. 4
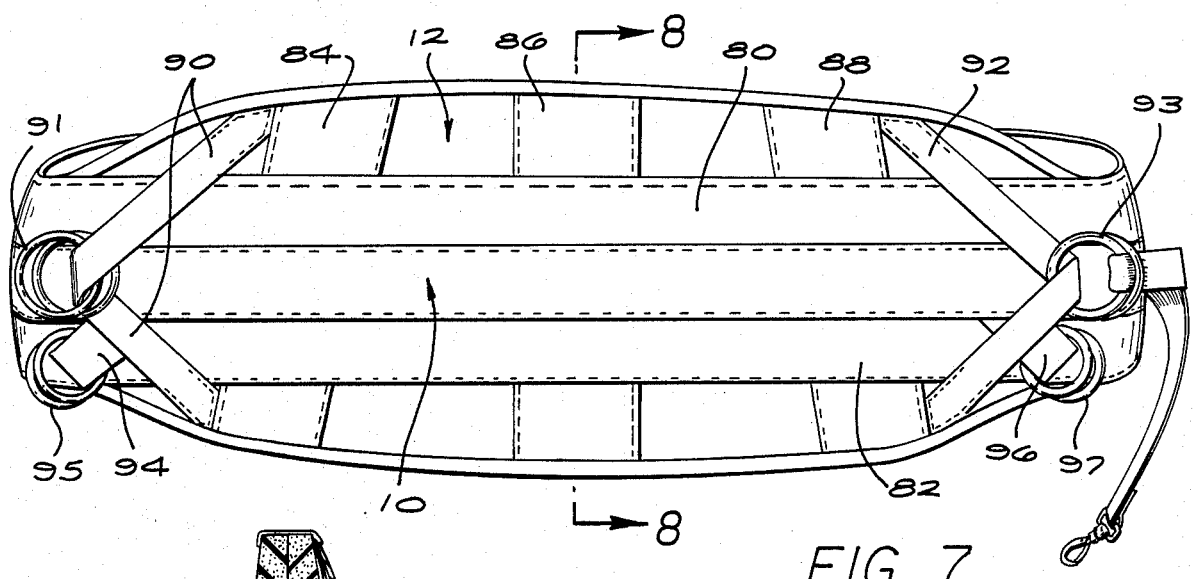
FIG. 7
FIG. 8

ROD BELT SUSPENSION SYSTEM

BACKGROUND OF THE INVENTION

An important new invigorating type of deep sea fishing has developed which presents a challenge and test of skill and strength of the fisherman against large game fish. The technique is known as stand-up fishing as compared with chair fishing in which a single fisherman can handle a single game fish with the fishing boat captain at his disposal to change the course and speed of the boat to aid in landing the game fish. The major forces are furnished by the tackle secured to the chair and the actual movement of the boat. High skill is needed in chair fishing and is particularly used for large game fish of over 1000 pounds.

It has been discovered that extremely challenging deep sea fishing is presented to the fisherman in catching game fish which are large by comparison with fresh water fish, including yellow fin tuna, wahoo, blue marlin, amber jack, mako, thresher and other shark species, as well as cod, yellow tail and large bottom fish, by stand-up fishing. Stand-up fishing basically involves a fishermen using shorter rods with a kidney harness and a gimbaled rod belt and waist band. Stand-up fishing has been used in challenging fishing with the game fish ranging from 20 pounds to 400 pounds by those with proper skills, experience and the proper gear. Sometimes the game fish will battle for several hours which provides a severe test of endurance for the fishermen and a need for the harness and rod belt to effectively transfer all of the load from the fish via the line and rod to the fisherman. In stand-up fishing, many fishermen will be simultaneously at work with the boat often dead in the water or anchored. Therefore, the fisherman also must have mobility to move around the rail as required to play his fish. Consequently, the rod and gear and harness must not interfere with his ability to freely move.

Prior art harnesses and rod belts are represented by the following U.S. Pat. Nos: 2,139,188, Dec. 6, 1938, A. S. Haislip; 2,271,136, Jan. 27, 1942, R. I. Geiger; 2,576,624, Nov. 27, 1951, J. Z. Miller; 2,995,855, Aug. 15, 1961, R. O. Bell; 3,115,997, Dec. 31, 1963, W. E. Hengst; Des. 193,166 July 10, 1962, W. E. Hengst; Des. 290,549 June 30, 1987, J. Rudy Smith.

None of the foregoing rod systems are effective in stand-up fishing, as I have found, because they fail to provide for the distribution of load in a way which allows the fisherman to use his body weight in a stablilized situation to play the fish and relieve the constant pressure on the fisherman's arms, neck, shoulder and back found in prior art systems.

BRIEF DESCRIPTION OF THE INVENTION

Faced with the availability of harnesses, I discovered that it is possible to make a balanced load system employing a kidney harness coupled with a suspended rod carrier which is conventionally termed a rod belt, and in this application is so termed. The rod belt is dimensioned to rest across the front of both upper legs of the fisherman to evenly transfer loading of the rod butt to the front of the fisherman's legs below his groin and to transfer the remaining load under static conditions with the fish running against reel drag or running transverse to the length of the rod totally to hips while supporting the lower back on a distributed basis by a kidney harness. The hands, under those circumstances, are used to maintain stability and lift the rod for reeling in the line. During conditions of the fish running hard away from the boat, both hands are used on the rod with the weight of the fisherman leaning backward plus any movement of the boat applying pressure to the game fish while resting the arms, neck, shoulders and back.

The rig does not prevent movement of the fisherman along the rail in either direction and the rod belt is designed to flex between the legs of the fisherman without danger of fracturing to provide further resiliency in the harness system.

The rod belt is suspended from the kidney harness by adjustable straps which allow the actual position of the rod belt to be lowered or raised along the fisherman's legs to a comfortable position across the top of the legs. As in prior art rod belts, a horizontal pin is used to position the gimbaled butt cap of the rod and to allow pivoting of the butt of the rod upward and downward while fishing in order to allow the fisherman to reel-in in a series of cycles in which he raises the rod and then rapidly lowers it to gain slack and removes the slack by reeling in the loose line. A series of the sequential reel-in operations brings the fish within landing distance of the boat.

BRIEF DESCRIPTION OF THE INVENTION

FIG. 1 is a perspective view of a rod belt suspension system of this invention in use;

FIG. 2 is a front elevational view of a prior art form of rod belt and harness;

FIG. 3 is a front elevational view of a rod belt suspension system of this invention;

FIG. 4 is a front elevational view of the rod belt portion of the system of this invention;

FIG. 5 is a side elevational view thereof;

FIG. 6 is a force diagram demonstrating the operation of this invention;

FIG. 7 is a rear elevational view of the kidney harness portion of this system; and FIG. 8 is a vertical sectional view of the kidney harness taken along lines 8—8 of FIG. 7;

FIG. 9 is a simplified force diagram of the prior art harness of FIG. 2.

DETAILED DESCRIPTION OF THE INVENTION

The fisherman's harness of this invention is illustrated in use in FIG. 1 in which a fisherman wears a waist belt generally designated 10 including a kidney pad or harness 12 including belt fastening 14 in the form of hook and pile fasteners at the front of his waist. The kidney harness 12 is in the order of 6 to 10 inches in height and encircles the rear of his waist and extends around his sides covering his hips. The overall length of the kidney harness 12 will vary with the size of fisherman but the following lengths, 45 inches, 51 inches and 60 inches including belt 10 have been found to be desirable for most men and women. A series of straps are sewn on the rear face of the kidney harness 12 as best illustrated in FIG. 7 in order to spread the load which is applied to the fisherman while working a large game fish. A pair of "D" or "O" rings 16 are secured to the kidney harness 12 near its ends and reel attachment straps 18 and 20 (both appearing in FIG. 3) are used to engage eyes on a reel 26 secured to the fisherman's rod 28.

Suspended from the belt 10, particularly from the kidney harness 12 by a pair of adjustable straps 30 and 32 is a rod belt 34 including a resilient pad 36 and a rod holder plate 38 having an integral socket 40. Hardly visible in FIG. 1 but best seen in FIG. 5 is a reinforcing plate 42 of a material such as ABS. The body of the rod holder plate 38 is fabricated, as by vacuum forming, from a particularly tough material such as DKE-450 extrusion resin of the E. I. DuPont & Co., of Wilmington, Del. This resin is capable of being thermoformed into shapes including the integral rod butt holder 40 plus guide ribs 44 and 46 (of FIG. 4) and reinforcing ribs 48 and 50. The combination of the particularly tough vacuum formed resin rod holder plate 38 and its backing 42 of material such as ABS bonded together produces a composite structure with the upstanding portions of the rod holder plate 38 actually closed bottom columns. The upstanding butt rod holder 40, guide ribs 44 and 46 constitute columns and the backing or reinforcing plate 42 closes the bottom of the columns. This combination of design and material makes a reliable resilient rod holder.

It should be noted that the harness 12 plus rod belt 34 define a triangular form load distribution system with the rod 28. The load on the fisherman is distributed between the waist and back, spread over a large area, by the kidney harness 12 and the fronts of the upper legs. The force distribution is illustrated in FIG. 6.

Systems like Hengst will not allow the fisherman to use heavy outfits because they do not engage the fisherman's leg muscles to the rod belt, and the harness shoulder strap attachments do not permit the fisherman to relax his shoulders or lower back. In fact, the Hengst harness keeps constant pressure on the lower back.

In an early attempt, I produced a harnessed belt and a gimbaled rod belt as illustrated in FIG. 2 which constitutes part of the prior art. This was similar to the prior art belts cited above but it was soon learned that it was inadequate to provide the balanced loading described above in connection with this invention as shown in FIGS. 1 and 6. Using such equipment for large game fish was tiring and concentrated the load on the fisherman, particularly on his lower back.

The prior art system of FIG. 2 has a different force diagram as illustrated in FIG. 9 with much greater loading on the back of the fisherman as illustrated by the longer arrows.

This may be contrasted with the force diagram of FIG. 6 for the harness of FIG. 3 in which the rod belt 34 is suspended by adjustable straps 30 and 32, each of which have a swivel 60 and 62 respectively, to allow free adjustability of the rod belt 34 below the waist. The kidney harness 12 spreads the load over the hips and lower back, and as it may be seen, with the location of the attachment straps 30 and 32, the downward force provided by the rod belt comes from the front of the hip region of the wearer. This location provides minimum discomfort for the fisherman. Of particular importance is the fact that with the balanced forces, there is no tendency to ride up above the hip and kidney area.

More details of the kidney harness and rod belt system of this invention may be seen by reference to FIGS. 4, 5, 7 and 8.

Referring now to FIGS. 4 and 5, in addition to the features of the rod belt 34 described above, the transverse pin 54 preferably of stainless steel, may be seen extending horizontally in the rod butt holder cup 40. The inclined ribs 44 and 46 guide the rod butt as it is inserted into the cup 40 as does a ramp 56. The size and shape and angle of these ramps are not critical but I have found that the angles shown in the drawing are effective in placing and holding the rod butt. Also visible FIGS. 4 and 5 are a number of plastic snap fasteners 70 which hold the rod holder plate 38 to the backing 36 and hold a pair of loops 72 for "D" rings 74 from which the rod belt 34 is suspended. The pad 36 is plastic impregnated nylon mesh cover 36A with a filling of closed cell plastic foam to provide resiliency.

Now referring to FIGS. 7 and 8 in which the kidney pad 12 and belt 10 are stitched together. FIG. 7 also shows two additional horizontal reinforcing webs of nylon strap material, namely straps 80 and 82, stitched below the level of the belt to effectively broaden the width of the belt 10. A number of additional reinforcing straps 84, 86 and 88 are shown also stitched to the body of pad 12. A strap 90 forms a loop to hold the "D" rings 91 at the left side and a similar strap 92 is secured at the right side to hold "D" rings 93. Additional secured straps 94 and 96 hold "D" rings 95 and 97 to attach the gimbaled rod belt of FIG. 4. The number and locations of reinforcing straps 84-88 is optional.

Now referring to FIG. 8, it may be seen that the kidney harness 12 includes a series of central reinforcing stays, 3 in number, one of which appears in FIG. 8, and closed cell foam filling 102. The stays 100 are located under the reinforcing strips 84, 86 and 88 of FIG. 7. The exterior nylon mesh 36A, along with the edge binding 104 completes the kidney pad 16. Altogether, employing the resilient closed cell foam 102 and the stays 100 and vertical reinforcement strips 84, 86 and 88 as well as the widening strips 80 and 82, an effective wide belt is provided.

I have found that by combining an effective kidney harness and attachment and an effective design of gimbaled rod belt with adjustable straps extending the rod holder below the level of the waist with full freedom to swivel, that a truly effective stand-up fishing harness is achieved.

The foregoing constitutes a disclosure of the best mode known to the inventor for carrying out his invention but is by no means limited to the embodiments illustrated. The scope of this invention is instead determined from the following claims and their equivalents.

What is claimed is:

1. A fisherman's harness and pivoted rod belt for use in stand-up fishing for large game fish employing a rod and reel with the rod having a transversely recessed butt end adapted to be retained in a socket and to pivot on a transverse pin therein and means in the region of the reel for attaching support straps thereto, the harness comprising in combination:

a waist belt;

kidney support pad means having a broad surface area in the order of at least 6 inches in width and a length sufficient to extend over the fisherman's lower back and hip portions;

said kidney support pad means supported by said waist belt;

a rod holder comprising an elongated flexible plate having a length sufficient to extend over the fronts of both upper legs of the fisherman;

said elongated flexible plate having an inner face adjacent to the fisherman's legs and an outer face defining a rod butt holding socket;

means suspending said elongated flexible plate from said belt at two spaced positions, one generally over each leg; and strap means secured to said belt for engaging said means on said rod in the region of said reel for supporting the rod and reel in the region of said reel;

whereby loading on the fisherman in stand-up fishing is distributed between the front of his upper legs and over an area on his back in the hip and kidney region;

and the rod holder has limited freedom of movement separate from the belt and kidney pad.

2. The harness and pivoted rod belt in accordance with claim 1 wherein said suspending means comprise adjustable straps.

3. The harness and pivoted rod belt in accordance with claim 1 wherein said flexible flat elongated plate is made of plastic and said socket is integrally formed therewith.

4. The harness and pivoted rod belt in accordance with claim 1 wherein said kidney pad is secured to said waist belt.

5. A fisherman's harness and pivoted rod belt for use in stand-up fishing for large game fish employing a rod and reel with the rod having a transversely recessed butt end adapted to be retained in a socket and to pivot about a transverse pin therein and means in the region of the reel for attaching support straps thereto, the harness comprising in combination:

a waist belt;

kidney support pad means having a broad surface area sufficient to extend over the fisherman's lower back and hip portions;

said kidney support pad means supported by said waist belt;

a rod holder comprising a plate having a length sufficient to extend across the fronts of both upper legs of a fisherman;

said plate having an inner face adjacent to the fisherman's legs and an outer face defining a rod butt holding socket;

means suspending said plate from said belt at two spaced positions, one generally over each leg; and strap means secured to said waist belt for engaging said means on said rod in the region of said reel for supporting the rod and reel in the region of said reel.

6. The harness and rod belt in accordance with claim 5 wherein said suspending means comprise adjustable length straps.

7. The harness and rod belt in accordance with claim 5 wherein said plate is elongated transversely across the legs of the fisherman and is of flexible plastic material.

8. The harness and rod belt in accordance with claim 5 wherein said socket is integrally formed on said plate in the region located between the fisherman's legs when the harness and rod belt are in position for use.

9. The harness and rod belt in accordance with claim 5 wherein said kidney pad is secured to said waist belt.

* * * * *